United States Patent
Nakayama et al.

(10) Patent No.: US 8,600,071 B2
(45) Date of Patent: Dec. 3, 2013

(54) VEHICLE EXISTENCE INFORMING DEVICE AND METHOD FOR INFORMING EXISTENCE OF A VEHICLE

(75) Inventors: Toshiaki Nakayama, Nishikamo-gun (JP); Toshio Hayashi, Obu (JP)

(73) Assignee: Denso Corporation, Kariya, Aichi-Pref. (JP)

(*) Notice: Subject to any disclaimer, the term of this patent is extended or adjusted under 35 U.S.C. 154(b) by 532 days.

(21) Appl. No.: 12/838,682

(22) Filed: Jul. 19, 2010

(65) Prior Publication Data
US 2011/0026729 A1 Feb. 3, 2011

(30) Foreign Application Priority Data
Jul. 30, 2009 (JP) ................................ 2009-178147

(51) Int. Cl.
H04B 1/00 (2006.01)

(52) U.S. Cl.
USPC .............. 381/86; 381/77; 381/97; 340/425.5; 180/271

(58) Field of Classification Search
USPC .............. 381/86, 150, 59, 58, 77, 82, 89, 97; 340/425.5, 436; 180/271
See application file for complete search history.

(56) References Cited

U.S. PATENT DOCUMENTS

| | | | | |
|---|---|---|---|---|
| 5,889,870 | A | * | 3/1999 | Norris .............................. 381/77 |
| 7,106,180 | B1 | * | 9/2006 | Pompei ....................... 340/384.7 |
| 2005/0195985 | A1 | * | 9/2005 | Croft et al. ....................... 381/77 |
| 2007/0257783 | A1 | | 11/2007 | Matsumoto et al. |

FOREIGN PATENT DOCUMENTS

| | | |
|---|---|---|
| JP | 2-265398 | 10/1990 |
| JP | 5-14992 | 1/1993 |
| JP | 10-201001 | 7/1998 |
| JP | 2007-182195 | 7/2007 |
| JP | 2007-237831 | 9/2007 |
| JP | 2007-328603 | 12/2007 |
| JP | 2008-113190 | 5/2008 |
| JP | 2008-258863 | 10/2008 |

OTHER PUBLICATIONS

Japanese Office Action dated May 24, 2011, issued in corresponding Japanese Application No. 2009-178147 with English Translation.

* cited by examiner

*Primary Examiner* — Vivian Chin
*Assistant Examiner* — Con P Tran
(74) *Attorney, Agent, or Firm* — Nixon & Vanderhye PC

(57) ABSTRACT

A vehicle existence informing device is configured to inform existence of a vehicle by using a warning sound at a frequency in an audible range. A speaker array includes at least two speakers arranged so that oscillation directions of oscillators of the at least two speakers substantially coincide with each other. The speaker array is configured to radiate a warning sound in air on a carrier wave, which is at a frequency in an ultrasonic range. A phase control unit is configured to advance and delay a phase of a sound wave radiated from one of the at least two speakers with respect to a phase of a sound wave radiated from another of the at least two speakers.

5 Claims, 4 Drawing Sheets

VEHICLE EXISTENCE INFORMING DEVICE AND METHOD FOR INFORMING EXISTENCE OF A VEHICLE

CROSS REFERENCE TO RELATED APPLICATIONS

This application is based on and incorporates herein by reference Japanese Patent Application No. 2009-178147 filed on Jul. 30, 2009.

TECHNICAL FIELD

The present invention relates to a vehicle existence informing device configured to inform existence of a vehicle. The present invention further relates to a method for informing existence of a vehicle.

BACKGROUND

In recent years, a large number of vehicles such as an electric vehicle or a hybrid car driven by a motor are in practice. An operation sound of a motor is quiet compared with an operation sound of an internal combustion engine when such a vehicle is in operation. Accordingly, a pedestrian or the like may not feel existence of such a vehicle. In consideration of such a problem, for example, Publication of Japanese Unexamined patent application 10-201001 (JP-A-10-201001) and Publication of Japanese unexamined patent application 2006-199110, which corresponds to US Patent 20070257783, propose a vehicle existence informing device. Specifically, such a vehicle existence informing device causes an audio speaker equipped to a vehicle so as to generate a warning sound such as a dummy engine sound, thereby to inform a pedestrian ahead of the vehicle of existence of the vehicle.

It is noted that such a warning sound is diffused therearound while being attenuated when simply radiated. In addition, such a vehicle existence informing device is supposed to be in an outdoor use. Accordingly, a large scale audio speaker having a waterproofing structure is needed. Consequently, mountability of such a vehicle existence informing device is low. In addition, a manufacturing cost of such a vehicle existence informing device becomes high. Furthermore, when a warning sound is radiated from an audio speaker, such a warning sound is audible for a person such as an occupant of the vehicle who does not need to feel existence of the vehicle. Accordingly, such a person may feel uncomfortable.

Publication of Japanese unexamined patent application 2007-182195 proposes a vehicle existence informing device configured to radiate a warning sound and transmit an electric wave for warning. This vehicle existence informing device enables a person to feel existence of a vehicle in a tactile or visual manner when receiving the electric wave. However, in this case, a vehicle needs to be equipped with a transmitting device of an electric wave. In addition, a person needs to bring a receiving device for receiving an electric wave and a tactile device or the like activated when receiving an electric wave in order to feel existence of a vehicle by receiving an electric wave transmitted from the vehicle existence informing device. It is noted that a person may forget bringing of such a receiving device and a tactile device. In this case, the person may be incapable of feeling existence of a vehicle consequently.

SUMMARY

In view of the foregoing and other problems, it is an object of the present exemplary embodiment to produce a vehicle existence informing device having a small-size waterproof structure, the vehicle existence informing device configured to cause a warning sound with a directivity and inform existence of a vehicle by using the warning sound. It is an object of the present invention to produce a method for informing existence of a vehicle.

According to one aspect of the present invention, a vehicle existence informing device configured to inform existence of a vehicle by using a warning sound at a frequency in an audible range, the vehicle existence informing device comprises a speaker array including at least two speakers arranged so that oscillation directions of oscillators of the at least two speakers substantially coincide with each other, the speaker array being configured to radiate a warning sound in air on a carrier wave, which is at a frequency in an ultrasonic range. The vehicle existence informing device further comprises a phase control unit configured to advance and delay a phase of a sound wave radiated from one of the at least two speakers with respect to a phase of a sound wave radiated from another of the at least two speakers.

According to one aspect of the present invention, a method for informing existence of a vehicle by using a warning sound at a frequency in an audible range, the vehicle existence informing device comprises causing a speaker array to radiate a warning sound in air on a carrier wave, which is at a frequency in an ultrasonic range, the speaker array including at least two speakers arranged so that oscillation directions of oscillators of the at least two speakers substantially coincide with each other. The method further comprises advancing and delaying a phase of a sound wave radiated from one of the at least two speakers with respect to a phase of a sound wave radiated from another of the at least two speakers.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

Embodiment

In the present embodiment, a vehicle existence informing device is configured to inform existence of a vehicle by utilizing a warning sound at a frequency in an audible range. The vehicle existence informing device includes a speaker array including at least two speakers configured to radiate a warning sound in air on a carrier wave, which is at a frequency in an ultrasonic range, the two speakers being arranged such that oscillators are in the same oscillation directions. The vehicle existence informing device further includes a phase control unit to advance and delay a phase of a sound wave radiated from one of the two speakers with respect to a phase of a sound wave radiated from another of the speakers.

Each oscillator of the two speakers is configured to oscillate in response to application of a voltage or supply of electric current, thereby to radiate a warning sound on a carrier wave to the air. The phase control unit is configured to switch a positive terminal and a negative terminal of one of the two speakers, thereby to advance and delay a phase of a sound wave radiated from the one speaker with respect to a phase of a sound wave radiated from the other speaker. The phase control unit switches the positive terminal and the negative terminal using a relay device or a switch device.

(Configuration of Vehicle Existence Informing Device)

As follows, a configuration of a vehicle existence informing device 1 will be described with reference to drawings. For example, the vehicle existence informing device 1 is provided to a vehicle such as an electric vehicle or a hybrid car, which is silently driven by a motor or the like and may not cause a pedestrian to feel existence of such a vehicle. For example, the vehicle existence informing device 1 is configured to inform a pedestrian of existence of a vehicle around the pedestrian.

Figure 1A:
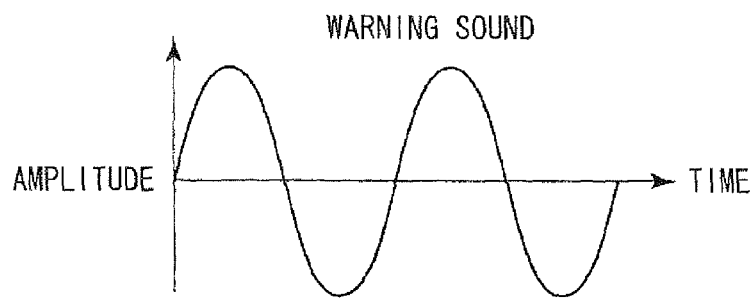
FIG. 1A is a time chart showing a wave form of a warning sound.
Figure 1B:
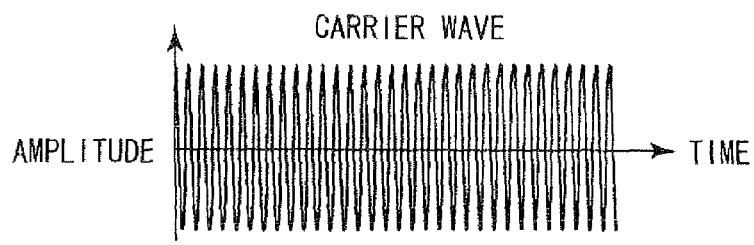
FIG. 1B is a time chart showing a wave form of a carrier wave.
Figure 1C:
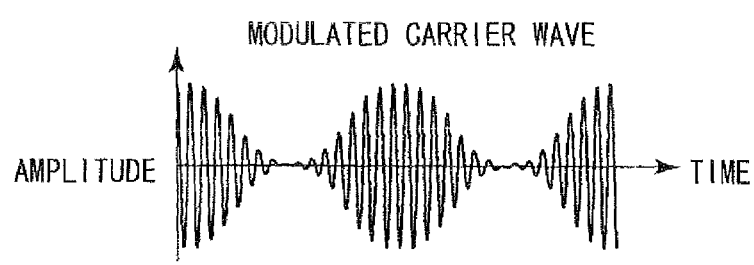
FIG. 1C is a time chart showing an ultrasonic wave obtained by modulating the carrier wave according to the warning sound.

The vehicle existence informing device 1 put (modulate) a warning sound (FIG. 1A) at a frequency in an audible range on a carrier wave (FIG. 1B), which is at a frequency in an ultrasonic range. The vehicle existence informing device 1 further radiates the generated warning sound as an ultrasonic wave to the air by using a principle of a "parametric speaker." The sound wave radiated from the vehicle existence informing device 1 is an ultrasonic wave. The radiated ultrasonic wave is generated by modulating the carrier wave according to the warning sound (FIG. 1C). The vehicle existence informing device 1 can cause the warning sound to have a significant directivity in the radiated direction by using an ultrasonic wave.

Figure 1D:
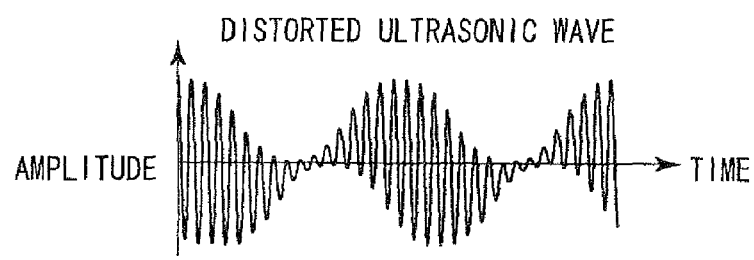
FIG. 1D is a time chart showing the ultrasonic wave being distorted.
Figure 1E:
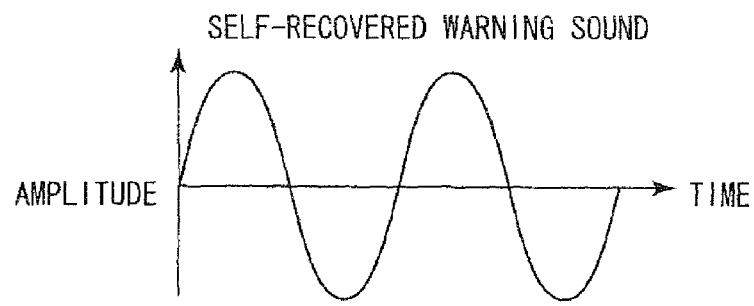
FIG. 1E is a time chart showing a warning sound after being self-recovered.

The ultrasonic wave radiated from the vehicle existence informing device 1 is distorted (FIG. 1D) due to a nonlinear characteristic of air while being propagated through the air. Specifically, such a distortion is caused by a characteristic of air, which takes longer time when recovering from compression than when being compressed. The ultrasonic wave performs a self-recovery according to the frequency of the carrier wave to be the warning sound (FIG. 1E).

Figure 2A:
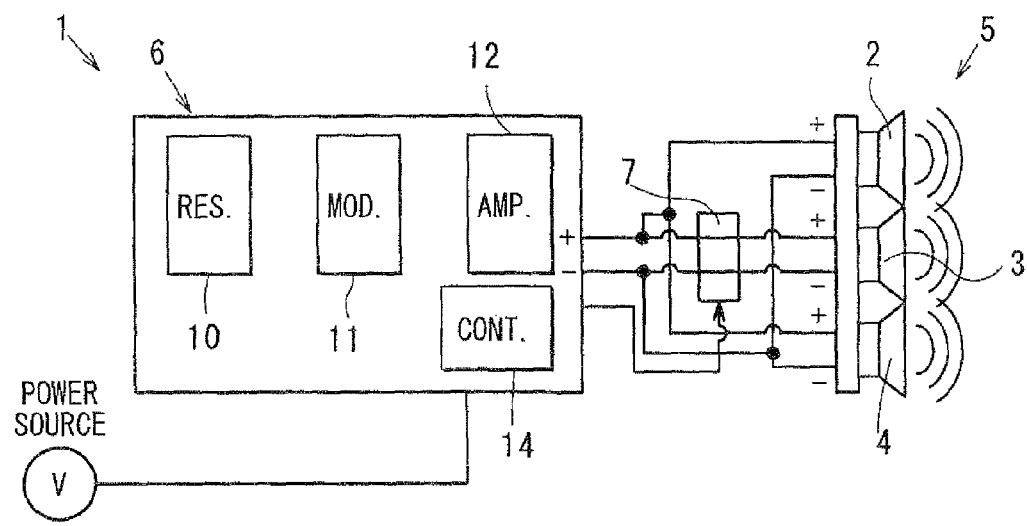
FIG. 2A is a block diagram showing a vehicle existence informing device before a relay box switches a positive terminal and a negative terminal.
Figure 2B:
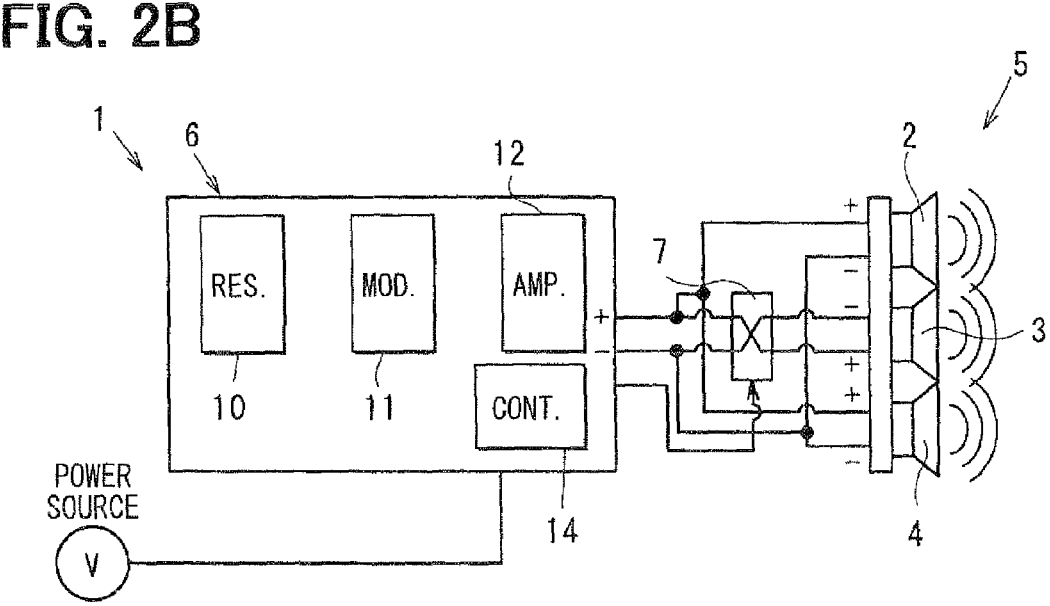
FIG. 2B is a block diagram showing the vehicle existence informing device after the relay box switches the positive terminal and the negative terminal.

For example, as shown in FIGS. 2A, 2B, the vehicle existence informing device 1 include a speaker array 5, a microcomputer 6, and a relay box 7. The speaker array 5 includes, for example, three speakers 2 to 4. The microcomputer 6 supplies electricity to an oscillator (not shown) of each of the speakers 2 to 4 to control an operation of the oscillator. The relay box 7 switches a positive terminal and a negative terminal of the speaker 3.

The speakers 2 to 4 of the speaker array 5 convert an electric signal such as a voltage applied to each oscillator into a mechanical oscillation. The speakers 2 to 4 further cause a sound wave at a frequency in an ultrasonic range by utilizing the mechanical oscillation. The oscillator to cause such a sound wave includes, for example, two separate electrodes spaced at a predetermined distance or a piezoelectric element having one free end and the other fixed end. The oscillator may include two electrodes. In this case, application of a voltage to the two electrodes and release of the applied voltage from the two electrodes are repeated so as to repeatedly cause a coulomb force between the two electrodes and repeatedly release the caused coulomb force. Thereby, one electrode can be oscillated by occurrence and release of a coulomb force so as to generate a sound wave. The oscillator may include a piezoelectric element. In this case, application of a voltage to the piezoelectric element and release of the voltage from the piezoelectric element are repeated so as to repeatedly cause a stretching load in the piezoelectric element and repeatedly release the caused stretching load. Thereby, a free end of the piezoelectric element can be oscillated by occurrence and release of a stretching load so as to generate a sound wave.

For example, the speakers 2 to 4 are arranged such that the oscillators are substantially in the same oscillation direction, and each of the oscillators is on the same line perpendicular to the oscillation direction. The speakers 2 to 4 are arranged such that the distance between the oscillators of the speakers 2 and 3 is substantially the same as the distance between the oscillators of the speakers 3 and 4. The microcomputer 6 has a generally-known structure and includes a CPU having a control function and a computation function, various kinds of storage devices such as a ROM and a RAM, an input device, an output device, and the like. The microcomputer 6 has functions of a resonator 10, a modulator 11, and an amplifier 12. The resonator 10 functions to generate an electric signal oscillating at a frequency in an ultrasonic range. The modulator 11 functions to modulate the electric signal generated by the resonator 10 based on a waveform of a warning sound. The amplifier 12 functions to amplify the electric signal outputted from the modulator 11 so as to enable the electric signal to drive the speakers 2 to 4.

For example, the microcomputer 6 further includes a function of a phase control unit 14. The phase control unit 14 functions to advance and delay a phase of a sound wave radiated from the speaker 3 with respect to a phase of a sound wave radiated from the speaker 2. A relay box 7, which will be described later in detail, also functions as the phase control unit 14. The relay box 7 switches the positive terminal and the negative terminal of the speaker 3 according to an instruction from the microcomputer 6 and conducts electricity supplied to the oscillator. The phase control unit 14 causes a phase of a sound wave radiated from the speakers 2 to be different from a sound wave radiated from the speakers 3. In addition, the phase control unit 14 causes a phase of a sound wave radiated from the speakers 3 to be different from a sound wave radiated from the speakers 4. Thereby, the phase control unit 14 controls a directivity of a warning sound. For example, in the state shown in FIG. 2A before the positive terminal and the negative terminal of the speaker 3 are changed, it is supposed that the speakers 2 and 3 radiate the same phase of a sound wave, and the speakers 3 and 4 radiate the same phase of a sound wave.

Figure 3A:
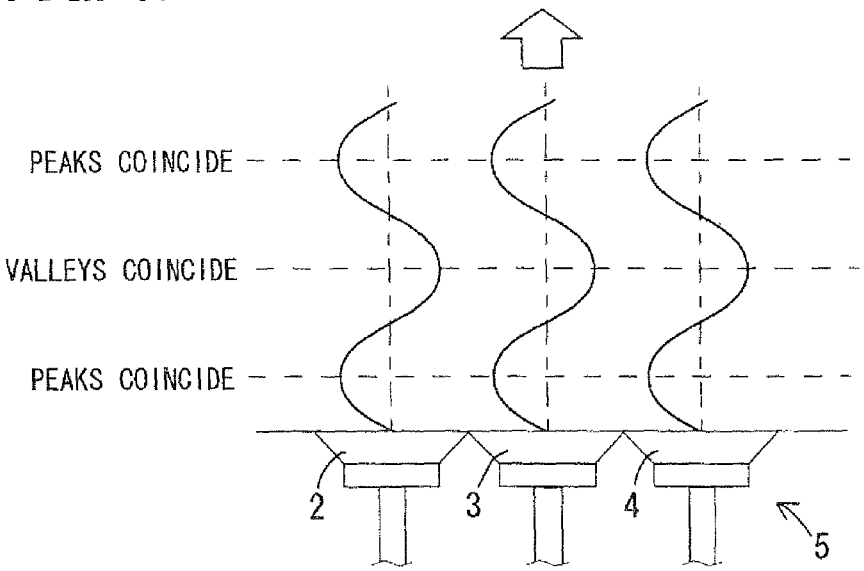
FIG. 3A is a view showing a sound wave being amplified before the relay box switches the positive terminal and the negative terminal.

In this case, as shown in FIG. 3A, in the direction in which the oscillator of each of the speakers 2 to 4 oscillates, i.e., in the front direction of the speaker array 5, peaks of sound waves radiated from the speakers 2 to 4 coincide to each other, and valleys of sound waves radiated from the speakers 2 to 4 coincide to each other. As a result, a sound wave is amplified in the front direction of the speaker array 5, thereby a self-recovered warning sound is loudly heard. Thus, the warning sound is directed to the front direction of the speaker array 5.

In the state shown by FIG. 2B, the positive terminal and the negative terminal of the speaker 3 are switched. In the present state, a phase of oscillation of the oscillator of the speaker 3 delays with respect to a phase of oscillation of the oscillator of each of the speakers 2 and 4 by 180 degrees. Therefore, a phase of a radiated sound wave from the speaker 2 is different from a phase of a radiated sound wave from the speaker 3 by 180 degrees. In addition, a phase of a radiated sound wave from the speaker 3 is different from a phase of a radiated sound wave from the speaker 4 by 180 degrees.

Figure 3B:
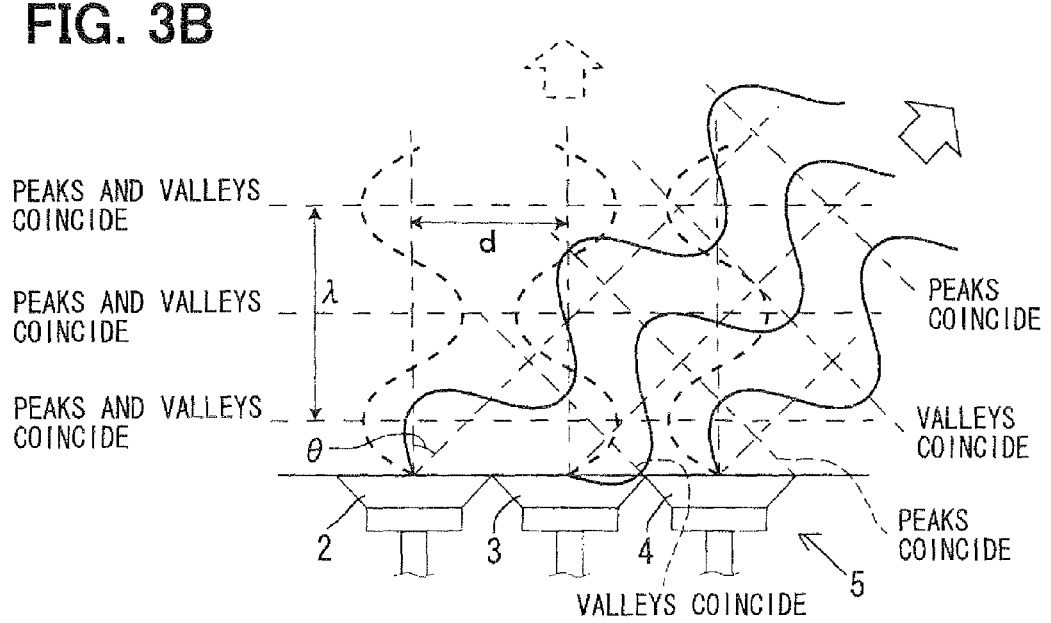
FIG. 3B is a view showing a sound wave being amplified after the relay box switches the positive terminal and the negative terminal.

Thereby, as shown in FIG. 3B, a peak of a sound wave radiated from the speaker 2 coincides with a valley of a sound wave radiated from the speaker 3 in the front direction of the speaker array 5. In addition, a valley of a sound wave radiated from speaker 3 coincides with the peak of a sound wave radiated from speaker 4 in the front direction of the speaker array 5. As a result, in the front direction of the speaker array 5, sound waves are cancelled without being amplified. On the contrary, in an inclined direction by an angle θ relative to the front direction of the speaker array 5, peaks of sound waves radiated from the speakers 2 to 4 coincide with each other, and valleys of sound waves radiated from the speakers 2 to 4 coincide with each other. The angle θ, the distance d between the oscillators of the speakers 2 and 3 (the distance d between the oscillators of the speakers 3 and 4), and the wavelength λ of a sound wave satisfy the following equation (1).

$$d \cdot \sin \theta = \lambda/2 \quad (1)$$

As a result, in the inclined direction by an angle θ relative to the front direction of the speaker array 5, a self-recovered warning sound is loudly heard. Thus, the warning sound is directed to the inclined direction by an angle θ relative to the front direction of the speaker array 5. Therefore, for example, when a value obtained by multiplying the value d by a square root of 2 coincides with the value X, after the positive terminal and the negative terminal of the speaker 3 are switched, the self-recovered warning sound can be heard loudly in the inclined direction by the angle θ relative to the front direction of the speaker array 5. Thus, the warning sound is directed in the inclined direction by 45 degrees relative to the front direction of the speaker array 5. The microcomputer 6 outputs an instruction to the relay box 7 at a predetermined interval so as to switch the positive terminal and the negative terminal of the speaker 3. Thus, the microcomputer 6 switches the inclination direction of a warning sound.

Figure 4A:
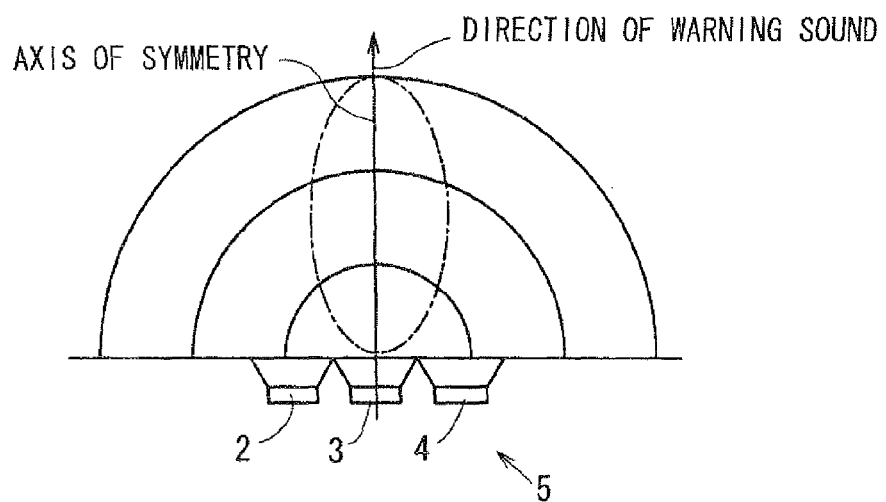
FIG. 4A is a view showing a directivity of a warning sound before the relay box switches the positive terminal and the negative terminal.
Figure 4B:
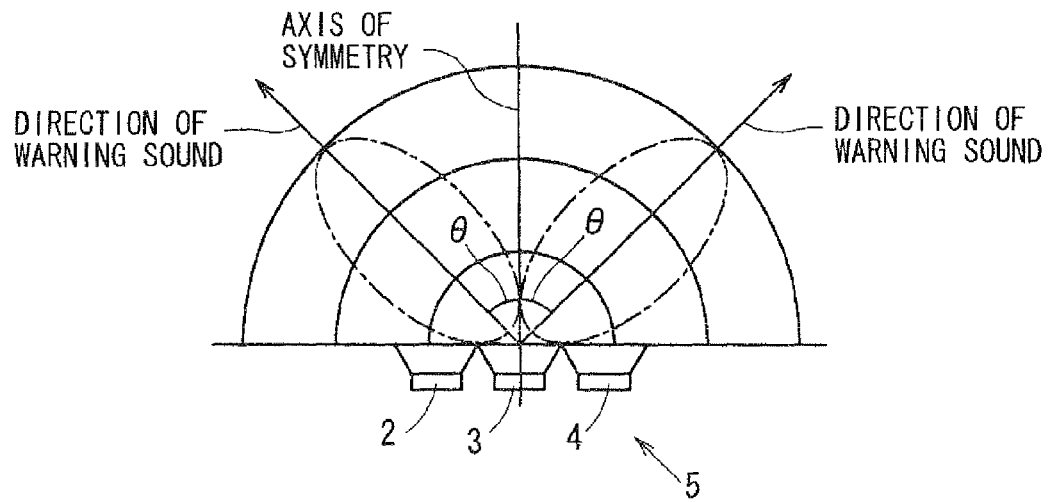
FIG. 4B is a view showing a directivity of a warning sound after the relay box switches the positive terminal and the negative terminal.

As shown in FIGS. 4A, 4B, the inclined direction by θ relative to the front direction of the speaker array 5 includes two directions. Specifically, the two directions include the direction inclined by θ clockwise relative to an axis of symmetry and the direction inclined by θ counterclockwise relative to the axis of symmetry. The axis of symmetry is directed in the front direction of the speaker array 5. Therefore, the inclination direction of the warning sound is switched among the front direction of the speaker array 5 (FIG. 4A), the inclined direction by θ clockwise relative to the front direction of the speaker array 5, and the inclined direction by θ counterclockwise relative to the front direction of the speaker array 5 (FIG. 4B).

(Effect of Vehicle Existence Informing Device)

In the vehicle existence informing device 1 according to the present embodiment, each of the speakers 2 to 4 of the speaker array 5 modulates the a warning sound into a carrier wave at a frequency in an ultrasonic range and radiates the modulated warning sound as an ultrasonic wave to the air. The microcomputer 6 outputs an instruction to the relay box 7 at a predetermined interval so as to switch the positive terminal and the negative terminal of the speaker 3. In this manner, the vehicle existence informing device 1 repeatedly causes a state, in which an oscillation of the oscillator of the speaker 3 coincides with an oscillation of the oscillator of each of the speakers 2 and 4, and a state, in which an oscillation of the oscillator of the speaker 3 is delayed with respect to an oscillation of the oscillator of each of the speakers 2 and 4. Thereby, the vehicle existence informing device 1 is capable of switching the inclination direction of the warning sound among the one direction in the front direction of the speaker array 5 and the two directions inclined by θ relative to the front direction of the speaker array 5. The θ satisfies the relation of the equation (1). Thus, without a large-scale speaker, the vehicle existence informing device 1 is capable of informing existence of a vehicle using a warning sound with a high directivity. In addition, the vehicle existence informing device 1 is capable of informing existence of a vehicle by radiating a warning sound in the at least 3 directions. In addition, directivity of a warning sound can be changed with a simple structure of such as the relay box 7 configured to switch the positive terminal and the negative terminal.

(Modification)

According to the vehicle existence informing device 1 of the embodiment, the relay box 7 switches the positive terminal and the negative terminal. It is noted that the positive terminal and the negative terminal may be switched by using a switch device. The positive terminal and the negative terminal may be switched with neither the relay device nor the switch device. For example, a single element of the microcomputer 6 may function as the phase control unit 14. In this case, the microcomputer 6 may control a phase of an electric signal outputted to the oscillator of each of the speakers 2 to 4 so as to change a directivity of a warning sound.

The structure of the speaker array 5 is not limited to that of the embodiment. For example, the speaker array 5 may include only two speakers 2 and 3. Alternatively, the speaker array 5 may include four or more speakers arranged in a linear shape, for example. Alternatively, the speaker array 5 may include multiple speakers arranged in a two-dimensional manner.

Summarizing the above embodiment, a vehicle existence informing device is configured to inform existence of a vehicle by using a warning sound, which oscillates at a frequency in an audible range. The vehicle existence informing device includes:

a speaker array including at least two speakers arranged so that oscillation directions of oscillators of the speakers are substantially the same as each other, the speaker array being configured to modulate a warning sound in air on a carrier wave, which oscillates at a frequency in an ultrasonic range, and configured to radiate the modulated warning sound; and a phase control unit configured to advance and delay a phase of a sound wave radiated from one of two speakers with respect to a phase of a sound wave radiated from another of the two speakers.

In this manner, each speaker functions as a parametric speaker to cause a radiated sound wave to perform a self-recovery in a position according to a frequency of a carrier wave, thereby the radiated sound wave becomes audible as a warning sound. Thereby, a warning sound with significantly high directivity can be obtained. In addition, the speaker array is small and has a waterproofing structure. Therefore, without using a large-scale speaker, the vehicle existence informing device can inform existence of a vehicle by using a warning sound.

In addition, the phase control unit enables a control of a phase of each sound wave in a direction in which a warning sound is to be directed, such that peaks of sound waves radiated from two speakers coincide with each other, and valleys of sound waves radiated from two speakers coincide with each other. In this manner, existence of a vehicle can be informed by radiating a warning sound in various directions.

The oscillator of each of the two speakers is configured to oscillate according to application of a voltage or supply of an electric current so as to radiate a warning sound in air on a carrier wave. The phase control unit is configured to switch a positive terminal and a negative terminal of one of the two speakers so as to advance and delay a phase of a sound wave radiated from the one of two speakers with respect to a phase of a sound wave radiated from another of the two speakers.

In this manner, a phase of a sound wave radiated from the one of two speakers can be reversed with respect to a phase of a sound wave radiated from another of the two speakers by switching the positive terminal and the negative terminal. Thus, by switching the positive terminal and the negative terminal, a warning sound can be directed in a predetermined direction determined according to the distance between the two speakers and the wavelength of the sound waves. Accordingly, the directivity of a warning sound can be easily switched.

The phase control unit is configured to switch the positive terminal and the negative terminal by using a relay device or a switch device. The phase control unit is a specific example configured to easily switch the directivity of a warning sound.

The above processings such as calculations and determinations are not limited being executed by the microcomputer 6. The control unit may have various structures including the microcomputer 6 shown as an example.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A vehicle existence informing device configured to inform existence of a vehicle by using a warning sound at a frequency in an audible range, the vehicle existence informing device comprising:
    a speaker array including at least two speakers arranged so that their respective acoustic outputs mix with each other, the speaker array being configured to radiate a warning sound in air on a carrier wave, which is at a frequency in an ultrasonic range; and
    a phase control unit configured to advance and delay a phase of an acoustic wave radiated from one of the at least two speakers with respect to a phase of an acoustic wave radiated from another of the at least two speakers;
    wherein each of the at least two speakers is configured to produce acoustic oscillations according to application of an electrical voltage or current so as to radiate in air said warning sound on a carrier wave, and
    the phase control unit is configured to switch a positive terminal and a negative terminal of one of the at least two speakers so as to advance and delay the phase of an acoustic wave radiated from the one of the at least two speakers with respect to the phase of an acoustic wave radiated from another of the at least two speakers, and
    wherein:
    the phase control unit is further configured to incline a direction of an acoustic wave by an angle $\theta$ relative to a front direction of the at least two speakers, by switching the positive terminal and the negative terminal, thereby to delay the phase of an acoustic wave radiated from the one of the at least two speakers with respect to the phase of an acoustic wave radiated from another of the at least two speakers by 180 degrees, wherein the angle $\theta$, a distance d between the oscillators and a wavelength $\lambda$ of a sound wave satisfy an equation of $d \cdot \sin \theta = \lambda/2$.

2. The vehicle existence informing device according to claim 1, wherein the phase control unit is configured to switch the positive terminal and the negative terminal by using a relay or switch device.

3. A method for informing existence of a vehicle by using a warning sound at a frequency in an audible range, the vehicle existence informing method comprising:
    causing a speaker array to radiate a warning sound in air on a carrier wave, which is at a frequency in an ultrasonic range, the speaker array including at least two speakers arranged so that their respective acoustic outputs mix with each other, each of the at least two speakers is configured to produce acoustic oscillations according to application of an electrical voltage or current so as to radiate in air said warning sound on a carrier wave;
    advancing and delaying the phase of a sound wave radiated from one of the at least two speakers with respect to the phase of a sound wave radiated from another of the at least two speakers; and
    switching a positive terminal and a negative terminal of one of the at least two speakers so as to advance and delay the phase of an acoustic wave radiated from the one of the at least two speakers with respect to the phase of an acoustic wave radiated from another of the at least two speakers,
    wherein the switching further includes:
    inclining a direction of an acoustic wave by an angle $\theta$ relative to a front direction of the at least two speakers, by switching the positive terminal and the negative terminal, thereby to delay the phase of an acoustic wave radiated from the one of the at least two speakers with respect to the phase of an acoustic wave radiated from another of the at least two speakers by 180 degrees, wherein the angle $\theta$, a distance d between the oscillators and a wavelength $\lambda$ of a sound wave satisfy an equation of $d \cdot \sin \theta = \lambda/2$.

4. A vehicle existence informing device configured to inform existence of a vehicle by using a warning sound at a frequency in an audible range, the vehicle existence informing device comprising:
    a speaker array including at least two speakers arranged so that their respective acoustic outputs mix with each other, the speaker array being configured to radiate a warning sound in air on a carrier wave, which is at a frequency in an ultrasonic range; and
    a phase control unit configured to advance and delay a phase of an acoustic wave radiated from one of the at least two speakers with respect to a phase of an acoustic wave radiated from another of the at least two speakers,
    wherein each of the at least two speakers is configured to produce acoustic oscillations according to application of an electrical voltage or current so as to radiate a warning sound in air on a carrier wave; and the phase control unit is configured to switch a positive terminal and a negative terminal of one of the at least two speakers so as to advance and delay a phase of an acoustic wave radiated from the one of the at least two speakers with respect to a phase of an acoustic wave radiated from another of the at least two speakers and thereby to cause three warning sounds including:

a warning sound directed towards a front direction of the speaker array;

a warning sound directed towards a direction inclined by an angle θ clockwise relative to the front direction; and a warning sound directed towards a direction inclined by the angle θ counterclockwise relative to the front direction; and wherein the angle θ, a distance d between the oscillators and a wavelength λ of a sound wave satisfy an equation of d·sin θ=λ/2.

5. A method for informing existence of a vehicle by using a warning sound at a frequency in an audible range, the vehicle existence informing method comprising:

causing a speaker array to radiate a warning sound in air on a carrier wave, which is at a frequency in an ultrasonic range, the speaker array including at least two speakers arranged so that their respective acoustic outputs mix with each other, each of the at least two speakers is configured to produce acoustic oscillations according to application of an electrical voltage or current so as to radiate in air a warning sound on a carrier wave;

advancing and delaying a phase of a sound wave radiated from one of the at least two speakers with respect to a phase of a sound wave radiated from another of the at least two speakers; and switching a positive terminal and a negative terminal of one of the at least two speakers so as to advance and delay the phase of an acoustic wave radiated from the one of the at least two speakers with respect to the phase of an acoustic wave radiated from another of the at least two speakers, wherein the switching further includes switching the positive terminal and the negative terminal so as to advance and delay the phase, thereby to cause three warning sounds including:

a warning sound directed towards a front direction of the speaker array;

a warning sound directed towards a direction inclined by an angle θ clockwise relative to the front direction; and a warning sound directed towards a direction inclined by the angle θ counterclockwise relative to the front direction, wherein the angle θ, a distance d between the oscillators and a wavelength λ of a sound wave satisfy an equation of d·sin θ=λ/2.

* * * * *